April 10, 1928.
L. O. BUIST
1,665,770
LIQUID CONTAINER
Filed Oct. 29, 1925
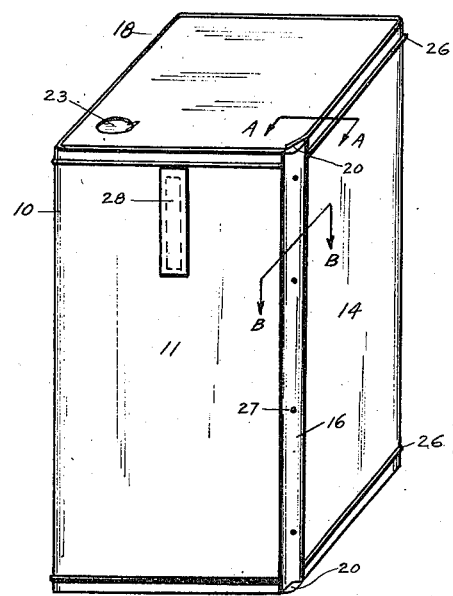
FIG. 1
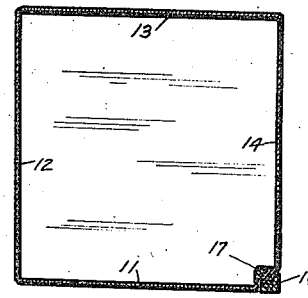
FIG. 2
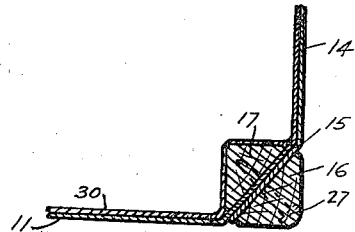
FIG. 5
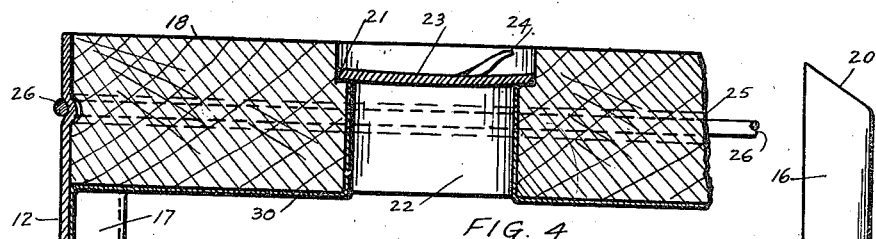
FIG. 4
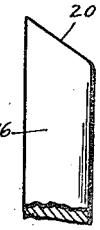
FIG. 7
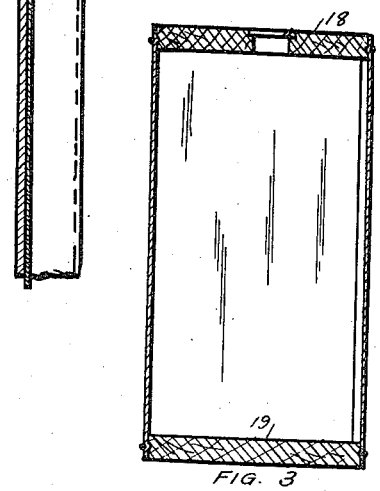
FIG. 3
FIG. 6
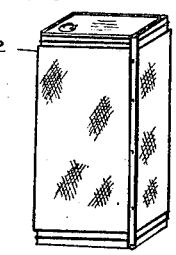
FIG. 8
INVENTOR:
L. O. Buist
BY
E. J. Fetherstonhaugh
ATTORNEY Patented Apr. 10, 1928.

1,665,770

UNITED STATES PATENT OFFICE.

LYMAN ORMISTON BUIST, OF TORONTO, ONTARIO, CANADA.

LIQUID CONTAINER.

Application filed October 29, 1925. Serial No. 65,589.

This invention relates to liquid containers as described in the present specification and illustrated in the accompanying drawings which form part of the same.

The invention consists essentially of the novel features pointed out broadly and specifically in the claim for novelty following a description containing an explanation in detail of an acceptable form of the invention.

In the present system of distributing milk and cream to the consuming public, glass bottles are extensively used. For reasons of public safety and of economy, these bottles must be thoroughly washed and sterilized before being filled, and after the contents have been used or removed, they are collected and transported back to the dairy where they are again washed and sterilized. It follows that, of the price of milk or cream paid by the public, an appreciable part of it goes to the cost of washing, sterilizing, collecting, distributing, as well as the replacing of a large number of bottles which have been lost or broken. The use of these glass bottles is also not without danger to the public, as they are subject to crack and break, and a cracked or broken bottle is a menace to the public safety and is a source of annoyance and worry to the public generally and to the automobilists especially.

The objects of the invention, therefore, are primarily to provide a container that will successfully replace the glass bottles now used, the cost of which will be so small as to make it economically possible to discard the container after the liquid has been removed; that will do away with the necessity of sterilization as the container is made under a very high temperature; a second object is to eliminate the danger incident to the use of such glass bottles; another object is to produce a light container whereby further economy is realized in that the weight of the container is small compared with the weight of the liquid contained therein; a further object is to effect economy of space occupied by the container by making it to a square cross section; the invention has also as an object to manufacture a container that will keep the liquids fresh for a considerable length of time without absorbing foreign flavors; to obviate the noise incident to the carrying of glass bottles; and generally, to furnish a practical, strong and economical container that will accomplish the aforesaid purposes and that may be found adaptable to other commodities than milk or cream.

In the drawings, Figure 1 is a perspective view of the container.

Figure 2 is a cross sectional plan view.

Figure 3 is a cross sectional elevation view.

Figure 4 is a fragmentary sectional view along "AA" in Figure 1.

Figure 5 is a fragmentary sectional view along line "BB" in Figure 1.

Figure 6 is a fragmentary cross sectional view of the bottom showing the groove.

Figure 7 is a fragmentary view of the outside stiffener.

Figure 8 illustrates the use of an outside reinforcing layer of some suitable fabric.

Like numerals of reference indicate corresponding parts in the various figures.

In the drawings, 10 is the container having the sides 11, 12, 13 and 14, and the top 18 and the bottom 19. The four sides are formed from a single cardboard blank, the side 14 overlapping the side 11 as at 15 and secured together as explained hereinafter. The carton is made of some suitable waterproof cardboard, and the top and bottom of some suitable lumber, preferably birch or maple. The top 18 and bottom 19 fit between the sides and are placed substantially flush with the edges of the sides, and they are provided with a circumferential groove 25 into which the carton is forced by means of wire hoops 26 tightly drawn around the carton opposite said grooves. The hoops are made by suitable welding or soldering the ends thereof. It will be seen that the top and bottom are thus firmly held in position within the four sides of the carton. The top and bottom are slightly rounded off at three corners to allow a good fit of the carton and beveled off on a fourth corner, so that the container has three rounded corners, and a beveled corner upon which the sides 11 and 14 overlap.

Upon the beveled corner, a stiffener 17 is applied inside and a stiffener 16 applied outside. The inside stiffener extends substantially between the inside surfaces of the top and bottom, and the outside stiffener extends substantially over the entire length of the carton. Nails 27 are inserted at intervals into and through the outside stiffener, through the overlapping sides 11 and 14 and partly through the inside stiffener 17. The outside stiffener 16 is chamfered at the top and bottom, as shown at 20, and is made of triangular cross section. The face of the stiffener 16 bearing upon the beveled corner is of sufficient size to substantially cover the entire surface of the beveled corner, so that the stiffener does not project outside the planes of the sides 11 and 14.

The top 18 is provided with a hole 22 having a shoulder 21 upon which the plug 23 is applied, closing the container. A tongue or tag 24 is provided in the plug 23 whereby it can be easily removed. A view or sight 28 is provided near the top of the container so as to allow a view into the container. The container is provided with an inside layer or coating 30 of water proof material, preferably paraffin, so as to effectively seal the container and render same impervious.

If the container is to be subjected to extremely rough handling, or if any special use should call for a very strong container, a carton having wire reinforcing inlaid in the fabric may be used; or a layer of cheese cloth, or such similar fabric 32 can be applied on the four sides of the container as shown in Figure 8.

Although the invention now applies especially to containers intended to contain milk or cream, it is nevertheless not restricted to that, as many other liquids and substances may be found adaptable to be effectively carried in such a container.

The construction of this container, as revealed in the drawings, offers a strong and sufficient construction for the purposes intended and may be altered to increase its strength or rigidity, as for example, two sets of stiffeners may be provided instead of one, but this would not be done without falling within the spirit and scope of this invention.

The container is folded to form the four sides while under a high temperature, and the stiffeners applied and nailed as shown. The top and bottom are then applied and secured by means of the wire hoops. The container is then immersed into a bath of molten paraffin and allowed to remain a short time, and then taken out of the bath and allowed to cool.

The container is used as any ordinary milk bottle. The milk is poured into the container, and the plug or lid applied by pressing down.

What I claim is:

A liquid container comprising a top and a bottom having three rounded corners and one beveled corner, a cardboard blank folded around said top and bottom and overlapping on the beveled corner and forming the four sides of said container, means for securing said blank to and around said top and bottom, and an inside and an outside wooden stiffener of triangular cross section lying upon said beveled corner and secured thereupon and to one another by a plurality of nails, and a coating of water proof material laid over and completely covering the inside surface of said container.

Signed at Toronto, Canada, this 5th day of October, 1925.

LYMAN ORMISTON BUIST.